United States Patent
Nakamichi et al.

(10) Patent No.: US 8,300,203 B2
(45) Date of Patent: Oct. 30, 2012

(54) DISPLAY APPARATUS

(75) Inventors: Masaya Nakamichi, Kizugawa (JP);
Shohei Takahashi, Daito (JP)

(73) Assignee: SANYO Electric Co., Ltd.,
Moriguchi-Shi (JP)

(*) Notice: Subject to any disclaimer, the term of this patent is extended or adjusted under 35 U.S.C. 154(b) by 140 days.

(21) Appl. No.: 12/872,238

(22) Filed: Aug. 31, 2010

(65) Prior Publication Data

US 2011/0051071 A1  Mar. 3, 2011

(30) Foreign Application Priority Data

Aug. 31, 2009 (JP) ................................. 2009-200864
Aug. 31, 2009 (JP) ................................. 2009-200865

(51) Int. Cl.
*G02F 1/1333* (2006.01)

(52) U.S. Cl. ......................................... 349/161; 349/56

(58) Field of Classification Search ................... 349/56, 349/58, 72, 162, 161
See application file for complete search history.

(56) References Cited

U.S. PATENT DOCUMENTS

| | | | | |
|---|---|---|---|---|
| 6,542,360 | B2* | 4/2003 | Koizumi | 361/679.47 |
| 6,643,129 | B2* | 11/2003 | Fujiwara | 361/679.47 |
| 7,948,575 | B2* | 5/2011 | Oh et al. | 349/58 |
| 8,184,228 | B2* | 5/2012 | Han et al. | 349/58 |
| 2002/0018335 | A1* | 2/2002 | Koizumi | 361/687 |
| 2004/0042171 | A1* | 3/2004 | Takamatsu et al. | 361/687 |
| 2005/0115216 | A1* | 6/2005 | Bauer et al. | 55/524 |
| 2006/0196643 | A1* | 9/2006 | Hata et al. | 165/104.33 |
| 2011/0051071 | A1* | 3/2011 | Nakamichi et al. | 349/161 |

FOREIGN PATENT DOCUMENTS

JP  2005-286987  10/2005

\* cited by examiner

*Primary Examiner* — Brian Healy
(74) *Attorney, Agent, or Firm* — NDQ&M Watchstone LLP

(57) ABSTRACT

A display apparatus has a first chamber accommodating a display panel, a second chamber accommodating a circuit board which controls the panel, and a heat radiating unit arranged at the rear side of the second chamber.

6 Claims, 6 Drawing Sheets

DISPLAY APPARATUS

This application is based on Japanese Patent Application No. 2009-200864 and 2009-200865, which are filed on Aug. 31, 2009, the contents of which are hereby incorporated by reference.

BACKGROUND OF THE INVENTION

1. Field of the Invention

The present invention relates to a display apparatus having a liquid crystal panel.

2. Description of Related Art

Conventionally, display apparatus was designed on the premise of indoor installation (for example, see JP 2005-286987A1), and such apparatus did not have measures to protect its display panel or circuit board for controlling the panel from rainstorm or dust. Thus, such display apparatus is unsuitable for outdoor installations.

In order to realize the outdoor installation, it can be considered to form an accommodation chamber having a waterproofing structure inside the housing and to accommodate the display panel and the circuit in the chamber However, if the panel and the circuit board are accommodated in the same chamber, the temperature of the chamber is easily raised because of the heat generated from the panel and the board. Thus, the performance of the panel may degrade because of its temperature and the image displaying may be disabled. Further, the temperature increase may cause trouble in the circuit board.

SUMMARY OF THE INVENTION

The first display apparatus of the present invention comprises:

a first chamber accommodating a display panel;

a second chamber accommodating a circuit board which controls the panel, and a heat radiating unit arranged at the rear side of the second chamber.

The second display apparatus of the present invention comprises:

a first chamber accommodating a display panel;

a second chamber accommodating a circuit board which controls the panel, and a fan equipping a waterproofing filter, wherein the fan is arranged at the opening formed on the rear side of the second chamber.

DETAILED DESCRIPTION OF PREFERRED EMBODIMENTS

A display apparatus according to an embodiment of the present invention is discussed in detail below with reference to drawings.

The First Embodiment

Figure 1:
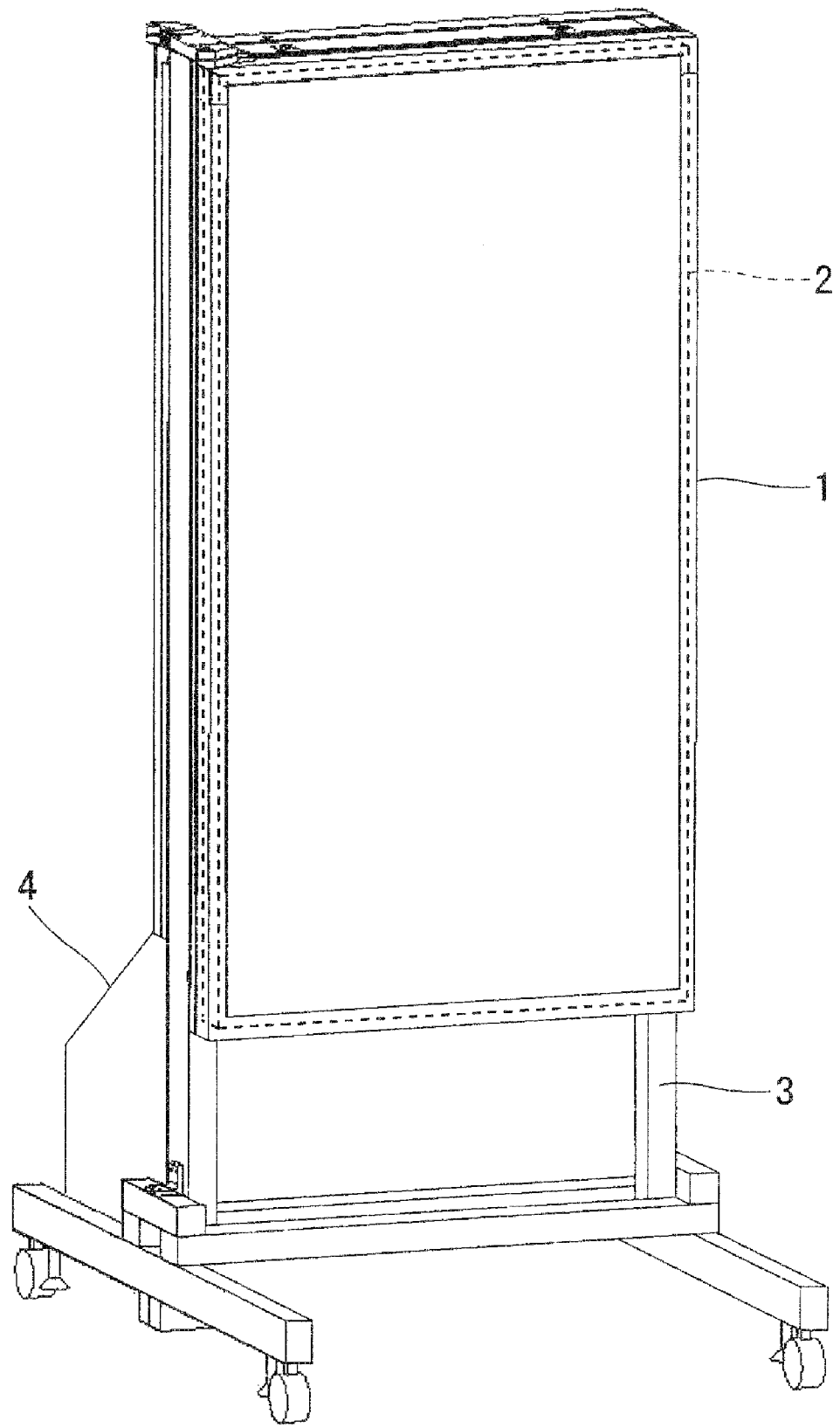
FIG. 1 is a perspective diagram of the display apparatus 100 viewed from the front side.

As shown in FIG. 1, the display apparatus comprises a housing 1, a liquid crystal display panel 2 arranged in the housing 1, a support base 3 for supporting the housing 1, and a cooling device 4. The support base 3 has a caster attached therewith. The panel 2 utilizes a light emitting diode (LED) as a light source for image display.

Figure 2:
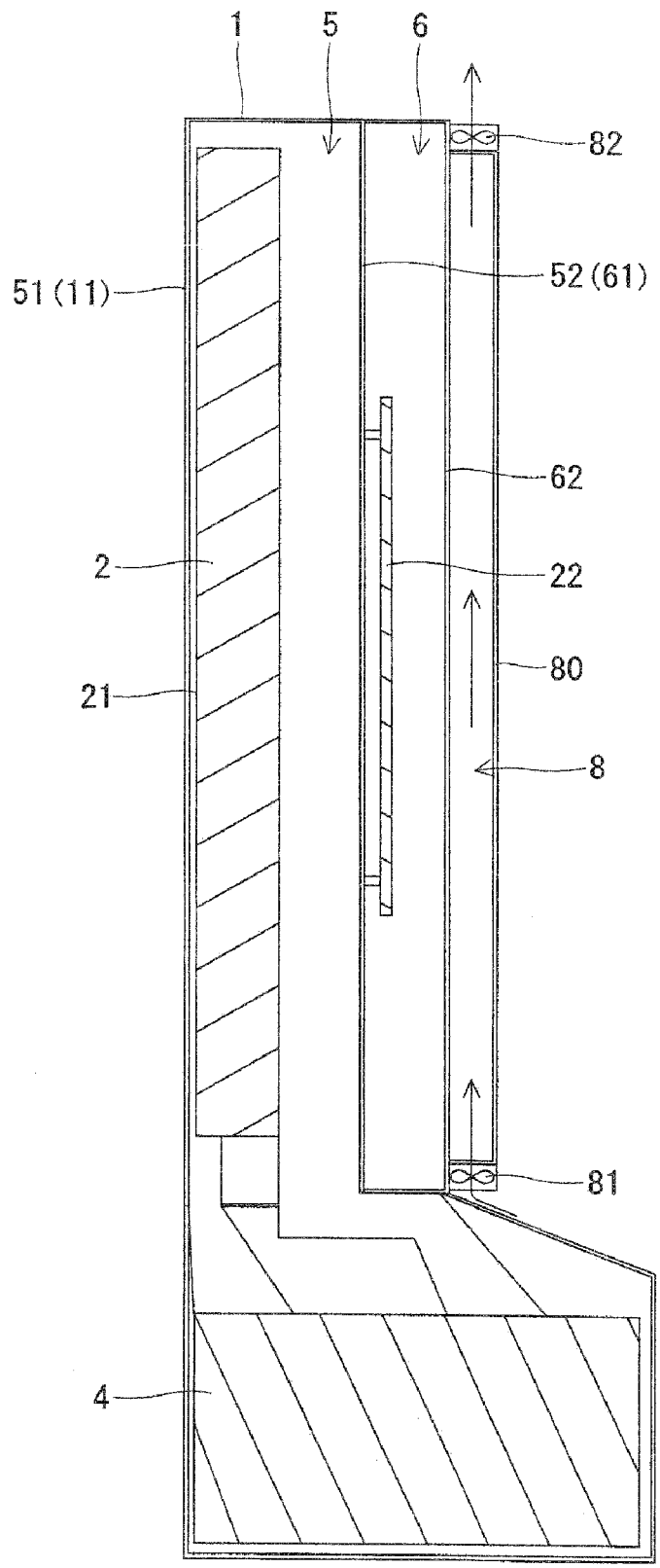
FIG. 2 is a perpendicular sectional view of the apparatus 100.

As shown in FIG. 2, the housing 1 includes therein a first accommodation chamber 5 having a sealed structure and a second accommodation chamber 6 having a waterproofing structure. A front wall 51 of the chamber 5 is formed by a front wall 11 of the housing 1, and the wall 11 is made of an optically transparent material such as a glass material. In contrast, an upper wall 53, a bottom wall (lower wall), both side walls (i.e. left side wall and right side wall) and a rear wall 52 of the chamber 5 are made of a metal such as aluminum.

The chamber 5 accommodates the panel 2 facing its screen 21 to the wall 11 (i.e. the wall 51). Thereby, a portion, where it face the screen 21, of the wall 11 forms an image display window which makes the screen 21 viewable from outside of the housing 1.

The chamber 6 is arranged on a rear side of the rear wall 52, which forms the chamber 5. A front wall 61 of the chamber 6 is formed by the rear wall 52. The upper wall, both side walls and a rear wall of the chamber 6 are made of a metal such as aluminum.

The chamber 6 accommodates therein a circuit board 22 controlling operation of the panel 2, and the board 22 is attached to a rear surface of the wall 61.

At the rear side of the rear wall 62, which forms the chamber 6, a cover component 80 covering said rear side is attached, and an ventilation way 8 which passes between the wall 62 and the component 80 is formed along the rear side of the wall 62 in the vertical direction.

Figure 3:
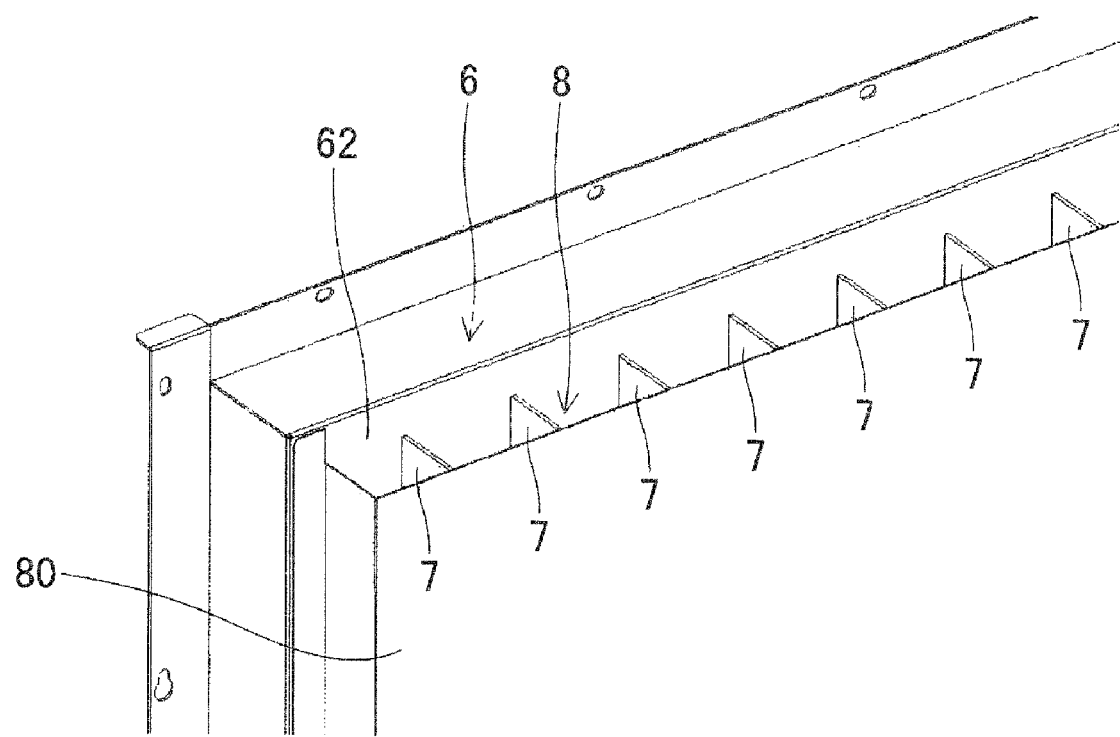
FIG. 3 is a perspective diagram of a ventilation way and a radiation fins viewed from the back upper side of the apparatus 100.
Figure 4:
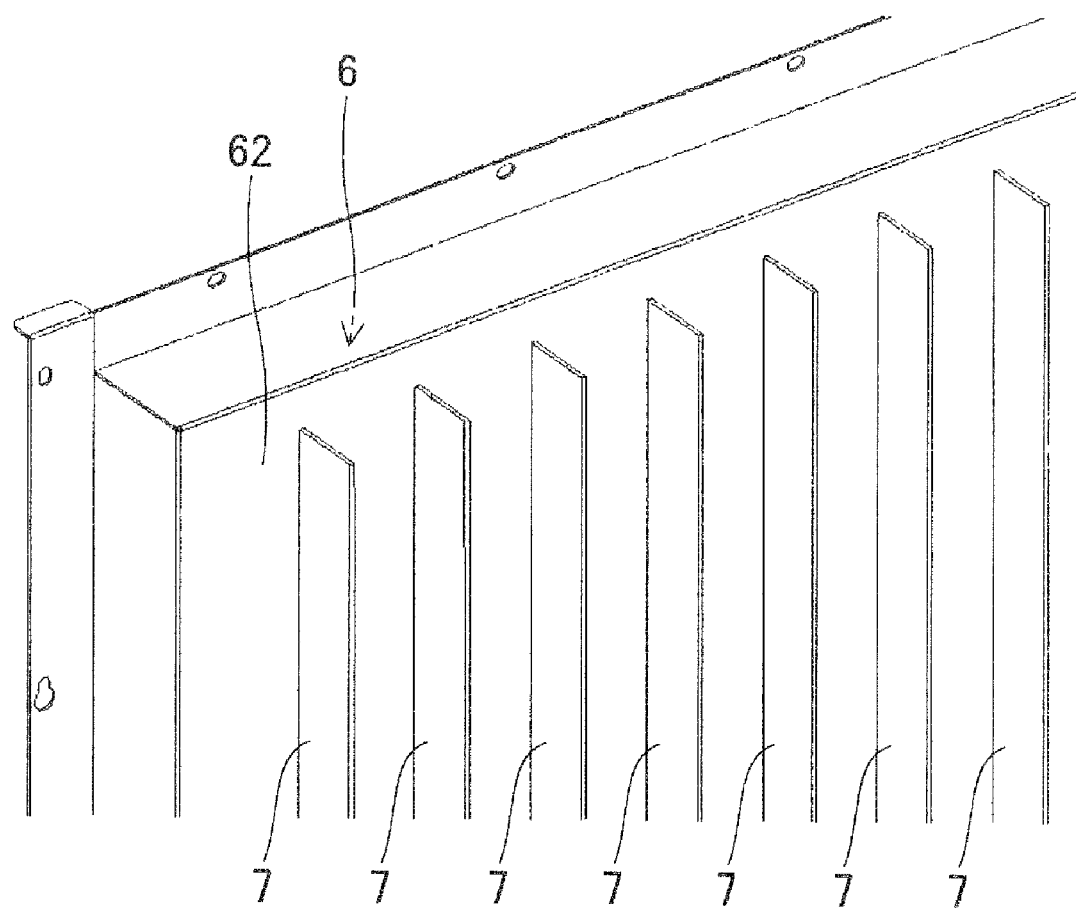
FIG. 4 is a perspective diagram of the fins.

As shown in FIG. 3, in the ventilation way 8, a plurality of radiating fin 7, 7 are arranged. Each of the fins 7 is arranged in the rear side of the wall 62 and extended in the horizontal direction along the wall 62 as shown in FIG. 4. Thus, by a heat exchange between the fins 7 and the air in a ventilation way 8, the heat inside the chamber 6 is emitted to the ventilation way 8 through fins 7.

As shown in FIG. 2, on the rear side of the rear wall 62, a pair of blowing units 81 and 82 is arranged in the upper side and the lower side of the area covered by a cover component 80 respectively. The lower unit 81 is arranged below the ventilation way 8 and facing toward the lower vent of the ventilation way 8. The upper unit 82 is arranged on the upper side of the ventilation way 8 but facing the opposite direction to the upper vent of the ventilation way 8. Thereby, as shown by a solid line arrow of FIG. 2, while air is inhaled in the ventilation way 8 by the lower unit 81, the air in the ventilation way 8 is emitted from the upper unit 82, and thus the air flow from the bottom up is formed inside the ventilation way 8.

The cooling device 4 is a device, which collect heat inside the chamber 5. The device 4 is arranged under the chamber 5 and is connected to the chamber 5. In detail, the device 4 includes an evaporator which collects heat inside the chamber 5, and a condenser which emit the heat collected by the evaporator outside. The evaporator and the condenser is connected each other by a pipe in which a coolant is flowing inside. Further, the cooling device 4 includes a compressor which compresses the coolant flowing between the evaporator and the condenser. Thereby, a coolant having a high temperature and high pressure flows to the condenser, and thus the heat collected by the evaporator is emitted efficiently by the condenser.

According to the apparatus 100, since the panel 2 is accommodated in the chamber 5 having a sealed structure, and the board 22 is accommodated in the chamber 6 having a sealed structure, the panel 2 and the board 22 does not contact outside air easily. Therefore, even when the apparatus is installed outside, the panel 2 and the board 22 are protected from rainstorm, dust and the like.

On the other hand, heat generated from the panel 2 stays inside the chamber 5 having a sealed structure, and thus the temperature in the chamber 5 tends to rise. Therefore, in the apparatus 100, the cooling device 4 is provided and the air inside the chamber 5 is cooled by the device 4. Therefore the temperature increase in the chamber 5 is inhibited, and the temperature increase of the panel is inhibited, and thus the panel 2 is maintained in the normal state.

Also, heat generated from the board 22 stays inside the chamber 6, and thus the temperature in the chamber 6 tends to rise. According to the apparatus 100, heat inside the chamber 6 is dissipated to the ventilation way 8, Thereby, the temperature increase in the chamber 6 is inhibited and thus the failure of the circuit board 22 due to heat can be prevented.

In the apparatus 100, an air flow is formed in the ventilation way 8 by the blowing units 81 and 82. Further, the air inside the ventilation way 8 flows from the bottom up, and the warm air have a nature of raising upward, the air inside the ventilation way 8 is effectively emitted outside from the ventilation way 8. Thus, each of the fins 7 can have a high cooling efficiency, and as a result, the temperature increase in the chamber 6 can be inhibited.

In the apparatus 100, the cooling device 4 may be utilized for cooling of both the panel 2 and the board 22. For example, it can be considered to cool the board 22 inside the chamber 6 from the bottom of the chamber 6 using the device 4. Further, the board 22 or portion of the board may be arranged inside the chamber 5 so that the board can be cooled by the device 4.

However, when LED is used as alight source, instead of a lamp such as CCFL or an ultra-high pressure mercury lamp, the cooling device 4 should cool not only the liquid crystal or the polarizer of the liquid crystal panel, but also the LED. Thus, according to the apparatus 100, the cooling device cools the panel 2 only, and the board 22 is cooled using the other measure.

The Second Embodiment

Figure 5:
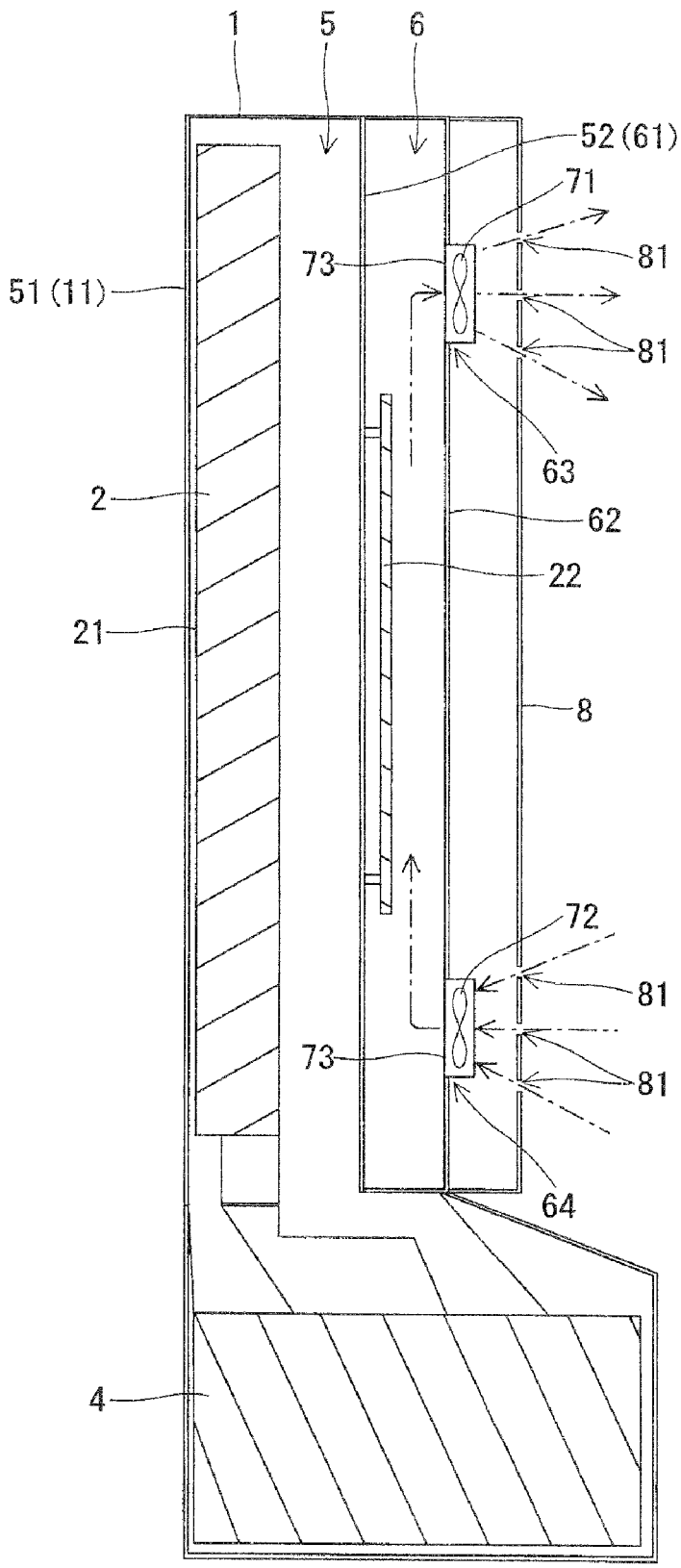
FIG. 5 is a perpendicular sectional view of the display apparatus 200.

FIG. 5 is a perpendicular sectional view of the display apparatus 200, which the other embodiment of the present invention. In this figure, the same symbol is given to the same portion shown in FIG. 2 (the apparatus 100), and the detailed description is omitted hereafter.

In the rear wall 62 of the second chamber 6, a pair of the opening 63 and 64 is formed in the vertical direction. In the upper opening 63, a first blowing unit 71 is fitted, and in the lower opening 64, the second blowing unit 72 is fitted. The unit 71 emits the air inside the chamber 6 outside from the opening 63, and the unit 72 inhales the air into the chamber 6 from the outside through the opening 64. Thereby, as shown by a dashed dotted line in FIG. 5, the air inhaled from the opening 64 passes inside the chamber 6 and emitted outside from the opening 63.

At the units 71 and 72, filter 73, having a waterproofing structure, is equipped respectively. Thus, immersion of the water from the opening 63 and 64, where the unit 71 and 72 is fit respectively, is prevented by the filters 73. Thereby, the waterproofing structure of the chamber 6 is maintained.

At the rear side of the rear wall 62, a cover component 8 covering the units 71 and 72 is attached. On the component 8, a plurality of vents 81-81 are arranged in a position facing the unit 71 or 72 or in its vicinity.

By covering the units 71 and 72 by the cover component 8, the waterproofing filers 73 equipped in these units (71 and 72) are hardly exposed to rainstorms or dust. Thus, it can prevent filters 73 from degrading and the waterproofing performance of the filters 73 is maintained for a long period.

Further, by arranging a plurality of vents 81-81 on the cover component 8, the blowing feature of the unit 71, in other words the function of emitting the air inside the chamber 6 to the outside, is not interfered by the cover component 8. Further, the blowing feature of the unit 72, in other words the function of inhaling the outside air into the chamber 6, is not interfered by the cover component 8.

Figure 6:
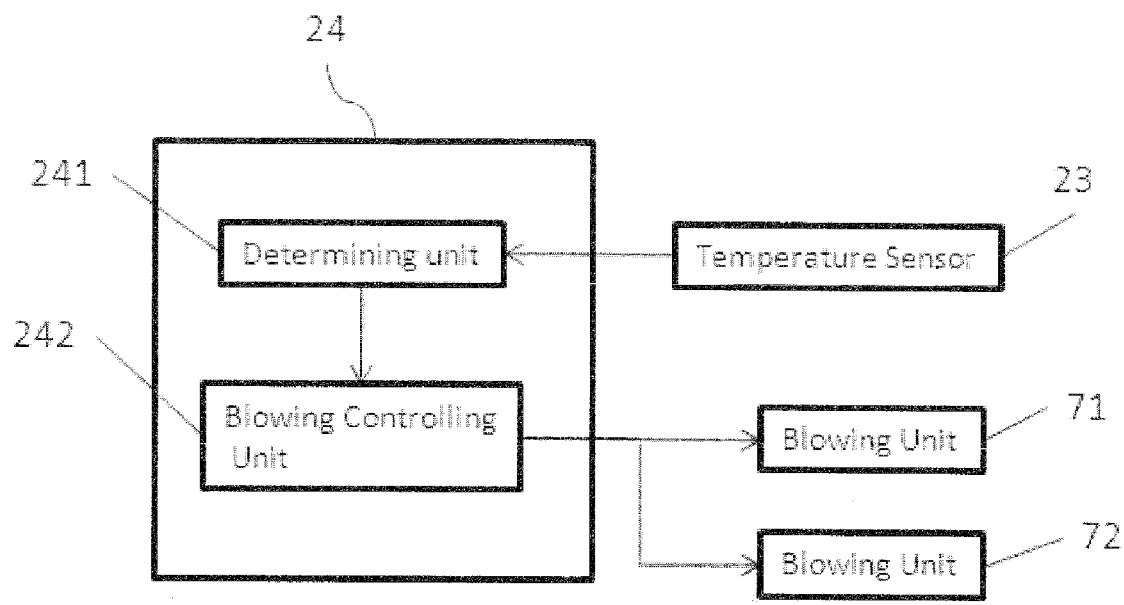
FIG. 6 is a block diagram showing the configuration regarding to a control of a blowing unit employed in the apparatus 200.

As shown in FIG. 6, the apparatus 200 further has a temperature sensor 23 and a control unit 24. The temperature sensor 23 is a sensor outputting temperature information which fluctuates according to the temperature inside the chamber 6. The control unit 24 controls the operation of the blowing units 71 and 72 based on the information outputted from the sensor 23.

In the control unit 24, a determining unit 241 and the blowing controlling unit 242 are comprised. The unit 241 determines whether the temperature inside the chamber 6 is higher than a predetermined temperature or not, based on the temperature information outputted from the sensor 23. The unit 242 controls units 71 and 72 so that these units execute the blowing operation when it is determined by the unit 241 that the temperature is higher than the predetermined temperature. The unit 242 controls units 71 and 72 so that these units terminate the blowing operation when it is determined by the unit 241 that the temperature is not higher than the predetermined temperature. Here, the example of the predetermined temperature is a temperature in which the circuit board 22 starts causing troubles.

The present invention is not limited to the foregoing embodiment in construction but can be modified variously within the technical range set forth in the appended claims.

For example, according to the above-mentioned displaying apparatuses, the front wall 61 of the second chamber 6 is constituted by the rear wall of the first chamber 5. Instead, the wall 61 may be constituted by the other wall component. In this case, the wall 61 may be arranged in the rear side of the wall 52, separately from the wall 52.

In the apparatus 100, although a radiating fin 7 is arranged in the rear side of the rear wall 62, the present invention is not limited to this. The other radiating means may be employed and can be arranged in the rear side of the rear wall 62.

In the above-mentioned display apparatus, two blowing units are employed in the rear side of the rear wall 62, however, the present invention is not limited to this. The number of the units may be one or more than three.

In the apparatus 100, the units 81 and 82 are arranged at the rear side of the rear wall 62, and at the upper side and bottom side the area covered by the cover component 80 respectively. In other words, the blowing units 81 and 82 are arranged outside the ventilation way 8. However, the present invention is not limited to this. The blowing unit may be arranged inside the ventilation way 8.

In the above-mentioned display apparatus, the ventilation way 8 is formed in the rear side of the rear wall 62 as well as the blowing units 81 and 82. However, the ventilation way 8 or the units 81 and 82 may be omitted if the high cooling efficiency is maintained nonetheless.

In the apparatus 200, both of the blowing units 71 and 72 may be the unit which emits the air inside the chamber 6 outside, or both of the units may inhale the outside air into the chamber 6.

In the apparatus 200, the filters 73 may further have a dust-proofing structure as well as the water proofing structure.

In the apparatus 200, the cover component 8 covering the blowing units 71 and 72 is attached to the rear side of the rear wall 62. However, if the filter 73 employed in the units 71 and 72 is hardly exposed to rainstorm or dust even without the cover component 8, the component 8 may be omitted from the apparatus 200.

The configuration employed in the display apparatus described above can be applied not only to the display apparatus with the panel 2, but also to display apparatuses with various image display panels such as a plasma display, or an organic EL (Electro-Luminescence) display. The light source other than the LED may be employed as well.

What is claimed is:

1. A display apparatus comprising:
    a housing;
    a first chamber accommodating a display panel;
    a second chamber accommodating a circuit board which controls the display panel, and
    a heat radiating unit arranged at the rear side of the second chamber, wherein the first chamber and the second chamber are formed in the housing and have waterproof structure.

2. The apparatus according to claim 1 further comprising:
    a ventilation way formed at the rear side of the second chamber extending along the rear surface of the chamber, and
    a blowing unit emitting the air inside the ventilation way outside, wherein
    the heat radiating unit is arranged inside the ventilation way.

3. The apparatus according to claim 1 wherein,
    the heat radiating unit is made of a heat radiating fin.

4. A display apparatus comprising:
    a housing;
    a first chamber accommodating a display panel;
    a second chamber accommodating a circuit board which controls the display panel; and
    a fan equipping a waterproofing filter,
    wherein
    the fan is arranged at the opening formed on the rear side of the second chamber, and
    the first chamber and the second chamber are formed in the housing and have waterproofing structure.

5. The apparatus of the claim 4, wherein the fan has a first fan and the second fan;
    the first fan blows outside air into the second chamber, and
    the second fan blows air inside the second chamber to the outside.

6. The apparatus of the claim 4, further comprising:
    a cover component arranged at the rear side of the second chamber, the component covers the fan, and
    a vent arranged to the cover component, at the position facing the fan.

* * * * *